W. H. KIMBALL.
SCROLL-SAWING MACHINE.

No. 169,553. Patented Nov. 2, 1875.

Witnesses:
Lewis F. Brown
A. P. Grant

Inventor:
Wm. H. Kimball
by John A. Wiedersheim
atty

UNITED STATES PATENT OFFICE.

WILLIAM H. KIMBALL, OF BURLINGTON, NEW JERSEY.

IMPROVEMENT IN SCROLL-SAWING MACHINES.

Specification forming part of Letters Patent No. 169,553, dated November 2, 1875; application filed August 2, 1875.

*To all whom it may concern:*

Be it known that I, WILLIAM H. KIMBALL, of the city and county of Burlington, and State of New Jersey, have invented a new and useful Improvement in Scroll-Sawing Machines; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1:
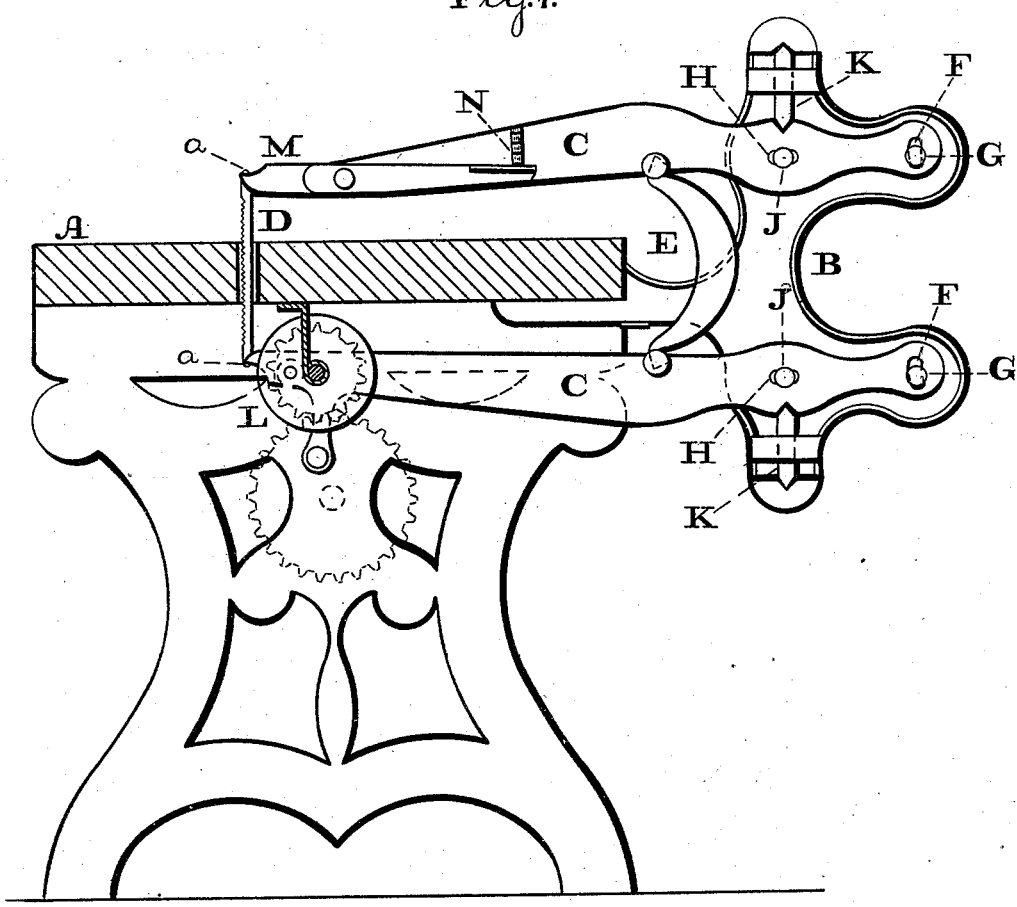
Figure 2:
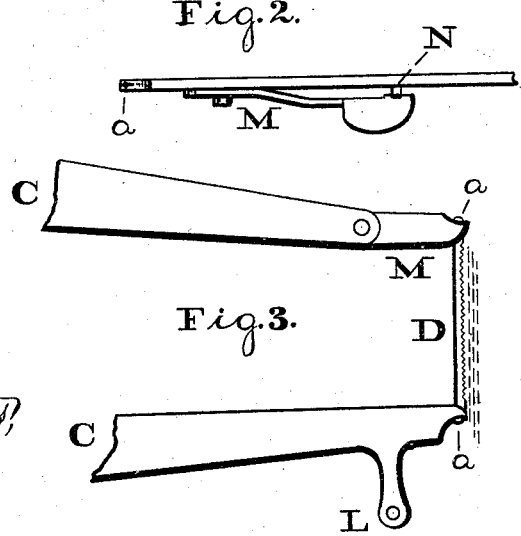
Figure 3:
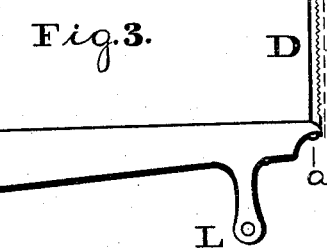

Figure 1 is a side view of the device embodying my invention. Fig. 2 is a top view of a portion thereof. Fig. 3 is a side view of a portion opposite to that shown in Fig. 1.

Similar letters of reference indicate corresponding parts in the several figures.

My invention consists in imparting to the saw an advancing motion in right lines. The saw is connected to two levers or arms, which have moving or sliding axes, and are slotted in the ends opposite those to which the saw is attached, so that the levers or arms will receive right-lined advancing motions, and thus carry the saw in advancing motions in right lines, or at a right angle to the transverse direction of the table. It also consists in means for easily operating the saw.

Referring to the drawings, A represents the table. To a support, B, attached thereto there are mounted two levers or arms, C, whose forward ends carry the saw-blade D. The arms C are held separated their proper distance by means of a stretcher, E, whose ends are pivoted loosely to said arms. In the ends of the arm opposite to the saw there are formed slots F, which extend vertically in a curved direction, and through the slots there pass screws, pins, or bolts, G, which are connected to the support B. In the arms, at points between the stretcher E and slots F, there are formed slots H, which extend horizontally in the longitudinal direction of the arms. Screws, pins, or bolts J pass through the slots, and are connected to the support B.

K represents steels, which are fitted, respectively, between the upper side of the upper arm and lower side of the lower arm, and the adjacent portions of the support B, and in contact therewith, and the ends of said steels are pointed, and bear loosely against the points of contact of the arms and support.

Reciprocating motion will be imparted to the arms C by means of the gearing L, or otherwise, and, owing to the slots F and H, the two arms C will receive right-lined sliding motions, so that the saw-blade will advance and cut in right lines, or at a right angle to the transverse direction of the table. In the movements of the arms C the steels K, turning on their points on the support B, receive rocking motions, and follow to the right and left the sliding movements of the arms, so that said steels provide movable axes for the arms, lessen friction thereon, and greatly ease the operation of the saw. To the outer end of the one arm C, preferably the upper one, there is jointed a lever, M, and on the face of the arm there are serrations or teeth, N, with which the rear end of the lever M is adapted to engage. The saw-blade will have its end formed with cross-heads or enlargements, $a$, and the ends of the lever M and the opposite arm C will be slit in a longitudinal direction, so that when the blade is fitted in the slits the heads $a$ will engage with bearing-surfaces, respectively, on the upper and lower faces of the lever and arm, near the ends thereof, said ends preventing longitudinal displacement of the saw. Now, draw down the handle end of the lever M, and operation will be found to tighten and strain the saw-blade. The lever catching in one of the teeth or serrations, it will lock the same and prevent the disengagement of the saw-blade. When, however, the blade is to be removed, the lever M is to be drawn from the tooth N, with which it was locked, and the said lever moves toward the opposite arm C, whereby the blade is no longer held, and its removal is readily accomplished.

Having thus described my invention, what I claim as new, and desire to secure by Letters Patent, is—

1. The two blade-carrying arms C, formed with vertical slots F and horizontal slots H, and operating substantially as and for the purpose set forth.

2. The steels K, in combination with the slotted blade-carrying arms C C, substantially as and for the purpose set forth.

W. H. KIMBALL.

Witnesses:
JOHN A. WIEDERSHEIM,
ALBERT H. HOECKLEY.